May 28, 1968   F. J. HAYNES   3,385,330
MITERING TYPE BAND SAW
Filed Oct. 24, 1965   2 Sheets-Sheet 1

INVENTOR.
FREDDIE J. HAYNES
BY
Dunlap and Laney
ATTORNEYS

May 28, 1968   F. J. HAYNES   3,385,330
MITERING TYPE BAND SAW
Filed Oct. 24, 1965   2 Sheets-Sheet 2

INVENTOR.
FREDDIE J. HAYNES
BY
Dunlap and Laney
ATTORNEYS

United States Patent Office 3,385,330
Patented May 28, 1968

3,385,330
MITERING TYPE BAND SAW
Freddie J. Haynes, 917 W. Silver Meadow,
Midwest City, Okla. 73110
Filed Oct. 24, 1965, Ser. No. 504,639
8 Claims. (Cl. 143—6)

ABSTRACT OF THE DISCLOSURE

A mitering type band saw which includes a main framework having a horizontal bed plate and a workpiece carriage pivotally mounted on the bed plate for pivotation about a vertical axis. A saw frame is pivotally mounted on the main framework for pivotation about vertical and horizontal axes and carries a saw blade which extends across the workpiece carriage. An angle indexing device is provided at one side of the main framework adjacent the location of the vertical and horizontal axes of the saw frame to permit the saw frame to be pivoted to a variety of precisely known, preselected angles relative to a reference line across the main framework and bed plate. A second angle indexing device is provided on the bed plate and workpiece carriage on the opposite side of the main framework from the first angle indexing device to permit the angular movement of the workpiece carriage about its vertical axis to be measured and fixed as desired. A plurality of fence sections are detachably and adjustably secured to the workpiece carriage for guiding and aligning a workpiece to be sawed.

---

This invention relates to an improved saw for sawing wood and, more particularly, relates to a continuously rotating band saw which is adapted to cut through a workpiece at various preselected angles.

A number of types of power saws which are capable of being pivoted or swung through different angles in order to cut through wooden or metal workpieces at various preselected angles have been heretofore proposed. Most of these devices, however, have been cumbersome and expensive structures and have not been susceptible to use with workpieces of varying sizes in an expedient manner.

The present invention provides an improved mitering type band saw which can be used to cut through workpieces of various sizes at substantially any preselected angle. The saw is adapted to be used in several different ways. Thus, a workpiece supporting carriage is pivotally mounted on the framework of the saw so that the workpiece can be pivoted to different angles with respect to the saw blade in order to adjust the direction of cut to a preselected angle. In some instances, where the workpiece is especialy large and bulky, it is preferable to adjust the saw to a different angle rather than moving the workpiece, and the apparatus of the present invention also permits this to be accomplished. Finally, the relatively light blade supporting frame of the saw assembly is pivotally mounted on a main framework of the assembly so that this frame and the saw blade it carries may be pivoted upwardly to permit a workpiece to be easily placed in position for sawing, or to permit the workpiece to be removed from the apparatus after it has been severed. The pivotal connection of the saw frame is such that it can be easily detached entirely from the main framework, and the saw made portable to facilitate its use in different locations remotely disposed with respect to the framework.

Broadly described, the mitering type band saw of the invention comprises a main framework which includes a horizontal bed plate having opposed end portions with at least one of these end portions terminating in an arcuate edge. A workpiece carriage is pivotally mounted on the bed plate for pivotation about a vertical axis. This carriage functions to support a workpiece as it is cut or severed by the mitering band saw, as hereinafter described. The workpiece carriage detachably supports a workpiece guide means, which, in a preferred embodiment of the invention, takes the form of a plurality of posts, or fence sections, which can be engaged with slots or holes in the workpiece carriage at several alternate positions thereon.

An angle indexing means is connected to the workpiece carriage for pivotation therewith, and projects across and beyond the arcuate edge of said bed plate. In a preferred embodiment of the invention, this angle indexing means comprises an elongated shaft or steering neck which carries a handle and a spring biased detent adapted to cooperate with notches or slots formed in or adjacent the arcuate edge at one end portion of the horizontal bed plate. The means for engaging the angle indexing means to the end portion of the horizontal bed plate can, of course, take other forms.

A saw frame is pivotally mounted on the main framework for pivotation about a substantially horizontal axis positioned on the opposite side of the bed plate from the arcuate edge hereinbefore described. A continuous saw blade is movably mounted in the saw frame and has an exposed cutting edge which extends across and above the bed plate at an angle not exceeding 90° to the workpiece guide means in all positions to which the workpiece carriage can be pivoted. Thus, the continuous saw blade is positioned to cut across the workpiece at varying preselected angles according to the position to which the workpiece carriage is pivoted.

Finally, the horizontal bed plate is provided with means adjacent the arcuate edge for indicating the angle made by the saw blade with the workpiece guide means and therefore with the workpiece. This angle indicating means can conveniently take the form of indicia indicating various angles, such as degree or minute marks, etched or engraved in the base plate adjacent the arcuate edge.

In one embodiment of the invention, it is a further feature of the apparatus that the saw frame which carries the continuous saw blade is pivotally connected to the main framework in a manner such that the saw frame can be swung about a vertical axis so as to change its angle with respect to the workpiece. This feature permits the angular relationship between the saw blade and the workpiece to be changed even in instances where the workpiece is so large and bulky that to change its angle with respect to the saw blade by moving the workpiece carriage about it spivotal axis would be inconvenient or impossible.

As a final major feature of the invention which can be included in a preferred embodiment thereof, the saw frame carries a pair of adjustable chucks which grip the continuous saw blade at longitudinally spaced intervals therealong so as to cause the blade to extend in a vertical plane with the exposed cutting edge pointing downwardly at all times. The adjustability of these chucks permits the length of saw blade which extends between the chucks to be varied according to the mechanical strain placed upon the blade during its operating life.

From the foregoing description of the invention, it will have become apparent that a major object of the invention is to provide an improved band saw which can be used to cut through a workpiece at various preselected angles.

Another object is to provide a mitering type band saw which can be used on a stationary framework for cutting at various angles through a workpiece, or which can be easily and quickly detached from the framework and used as a portable band saw.

Yet another object of the invention is to provide a band saw apparatus which can be utilized for cutting at different angles either by shifting a workpiece beneath the saw blade or by shifting the saw blade while retaining the workpiece in a fixed position.

In addition to the foregoing described objects and advantages, additional objects and advantages will become apparent as the following detailed description of the invention is considered in conjunction with the accompanying drawings.

Figure 1:
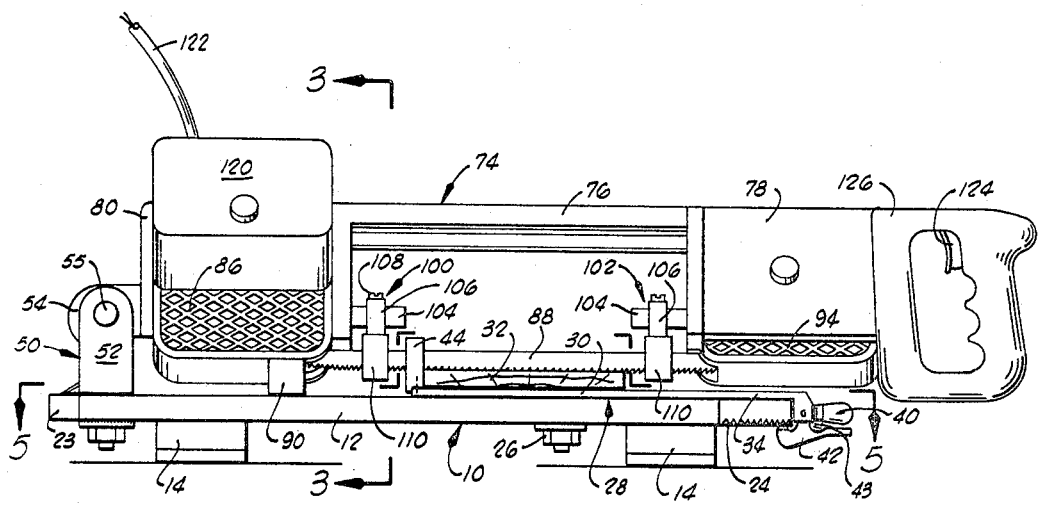
FIGURE 1 is a side elevational view of one embodiment of the mitering band saw of the invention.

Referring now to the drawings, and particularly to FIGURE 1, the mitering band saw of the invention comprises a main framework designated generally by reference character 10. In the illustrated embodiment, the framework 10 includes a horizontal bed plate 12 which has secured thereto, a plurality of downwardly depending legs 14 which adapt the bed plate to be mounted on a table or other horizontal surface.

Figure 4:
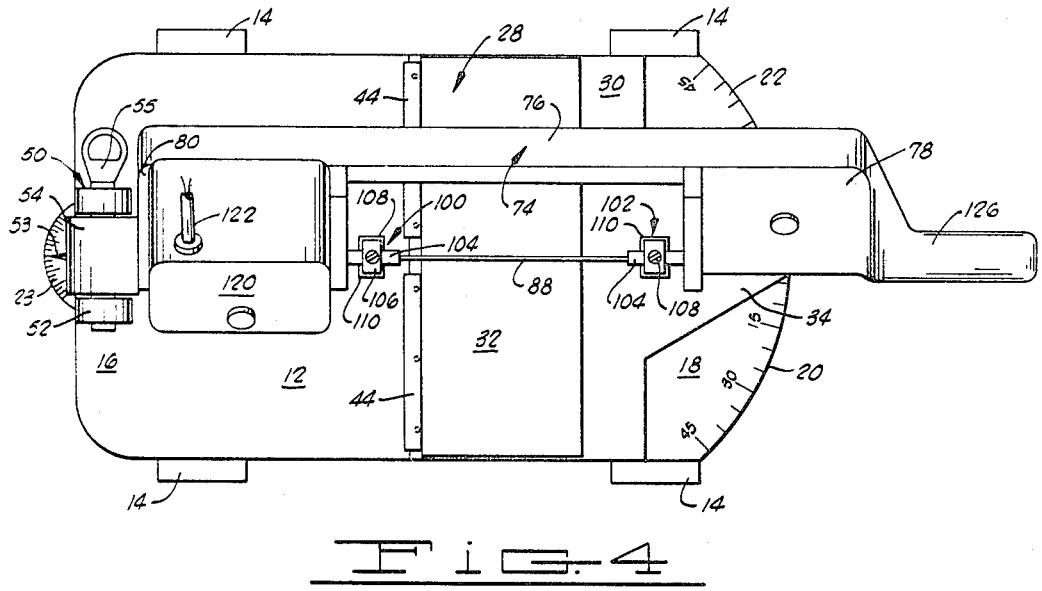
FIGURE 4 is a plan view of the saw illustrated in FIGURE 1.
Figure 5:
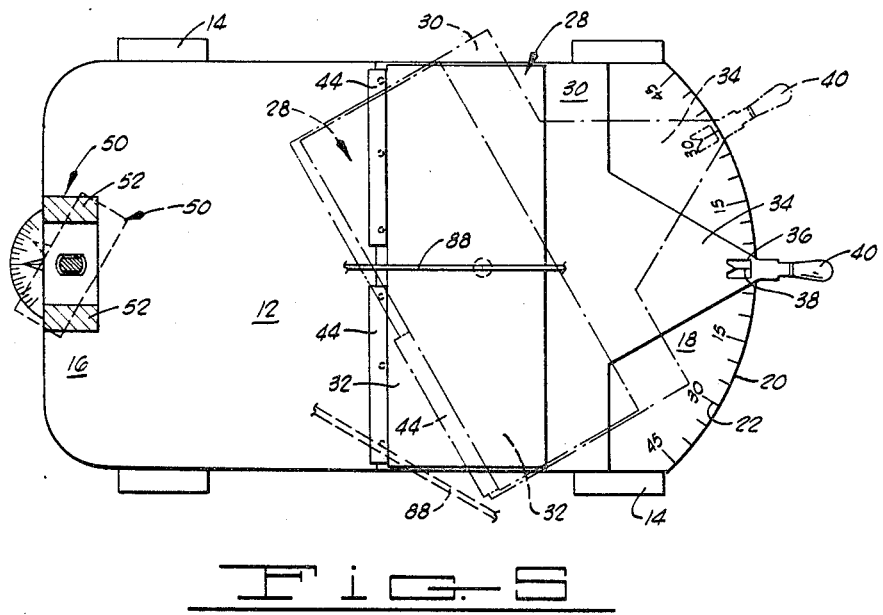
FIGURE 5 is a section taken along line 5—5 of FIGURE 1.

The bed plate 12 includes a pair of opposed end portions 16 and 18 (see FIGURES 4 and 5) with one of the end portions 18 terminating in an arcuate edge 20. The arcuate edge 20 is preferably formed on the circumference of a circle and, as depicted in FIGURES 4 and 5, carried a graduated scale 22 which can suitably be marked off in degrees, or in whole multiples of degrees.

Adjacent the arcuate edge 20 of the end portion 18 of the bed plate 12, and positioned on the bottom side of the bed plate directly beneath the scale 22, are a plurality of notches or serrations 24 aligned with each of the degree or multiple degree marks on the scale. The purpose of these notches or serrations will be subsequently explained.

At the center of the opposite end portion 16 of the bed plate 12, a graduated, arcuate protuberance 23 is provided, and carries a scale made up of angle indicating indicia.

Pivotally mounted on the bed plate 12 by means of a pivot pin 26 is a workpiece carriage designated generally by reference character 28. The workpiece carriage 28 includes a supporting plate 30, which is pivotally and slidably mounted on the upper surface of the base plate 12, and a wooden saw pad 32, which is secured to the upper surface of a supporting plate 30 for pivotal movement therewith. A steering neck 34 is secured to, or formed integrally with, one end of the supporting plate 30 and projects across and beyond the arcuate edge 20 of the bed plate 12. A slot 36 is provided in the steering neck 34, and an index hairline 38 extends across the slot and over the scale 22 in order to provide a means of alignment of the workpiece carriage with a particular graduation on the scale 22. A handle 40 is attached to the protruding end of the steering neck 34 and, as best illustrated in FIGURE 1, has pivotally connected thereto a detent 42 biased downwardly by a spring 43. The handle 40 and detent 42 can be gripped so as to release the detent from the serrations or notches 24 formed on the underside of the bed plate 12 beneath the scale 22.

On the opposite side of the supporting plate 30 from the side carrying the steering neck 34, a plurality of apertures (not visible) or formed in the supporting plate adjacent the transversely extending edge thereof, and function to receive pegs or projections (not visible) carried by a plurality of fence sections 44. The fence sections 44 have flat linear surfaces which are aligned so that the fence sections function as workpiece guide means in order to permit a workpiece, such as a piece of wood which is to be sawed, to be positioned or rested on top of the saw pad 32 and aligned in the proper position with respect to the saw blade as hereinafter explained. In other words, fence sections 44 are aligned in parallelism with the transverse edge of the supporting plate 30 and extend upwardly from the supporting plate to provide a substantially planar support or abutment against which the workpiece is placed preparatory to sawing. It will be noted that, because of the detachability of the fence sections 44, they may be moved to varying positions along the supporting plate 30 in order to permit a saw blade to pass therebetween when the workpiece carriage 28 is pivoted to various positions on the bed plate 12, as will be hereinafter described in greater detail.

The end portion 16 of the bed plate 12 is provided with a U-shaped bracket 50 having a pair of upwardly extending spaced parallel legs 52. The web portion of the bracket 50 carries a pointer 53 which extends over the graduated, arcuate protuberance 23 and is movable with the bracket. The bracket 50 pivotally journals a cam arm 54, the configuration of which is best illustrated in FIGURES 1, 2, 4 and 6. Pivotal connection of the cam arm 54 to the bracket 50 is accomplished by means of quick-detachable pivot pin 55 which can be quickly removed from the legs 52. The cam arm 54 carries a cam surface 56 which is positioned immediately above a pivot bolt 58 by which the bracket 50 is pivotally secured to the bed plate 12. The pivot bolt 58 carries a head having an arcuate upper surface for cooperation with the cam surface 56, and has a shank portion which extends through a helical spring 60 which constantly biases the head of the pivot bolt upwardly and away from the web portion of the bracket 50 and the base plate 12. On the opposite side of the base plate 12 from the head of the pivot bolt 58, the shank of the pivot bolt carries a suitable nut 62 and a serrated or notched washer 64 which is biased by the nut 62 into engagement with cooperating serrations or notches 63 formed in the bottom of the base plate 12. The adjustment of the nut 62 with respect to the head of the pivot bolt 58 is such that when the pivot bolt is biased downwardly by the cam surface 56, the serrated washer 64 is forced out of engagement with the cooperating serrations or notches in the bed plate 12.

The cam arm 54 is connected to, or formed integrally with, a saw frame designated generally by reference character 74. The saw frame 74 includes an elongated blade housing 76 which is connected at each of its ends to disc housings 78 and 80. The disc housings 78 and 80 each rotatably journal a blade-supporting disc. In the illustrated embodiment, cam arm 54 is welded or otherwise suitably secured to the disc housing 80. The disc housing 80 is provided with a downwardly extending blade guard 86 which is disposed on opposite sides of, and beneath, a continuous band type saw blade 88 which passes around the respective blade-supporting disc. A saw frame support block 90 is secured to the bottom of the blade guard 86 and is positioned to bear against the upper surface of the bed plate 12 when the saw frame 74 extends in a substantially horizontal direction as illustrated in FIGURE 1. The disc housing 78 at the opposite end of the saw frame 74 also carries a blade guard 94 which is positioned on opposite sides of, and below the saw blade 88.

Figure 2:
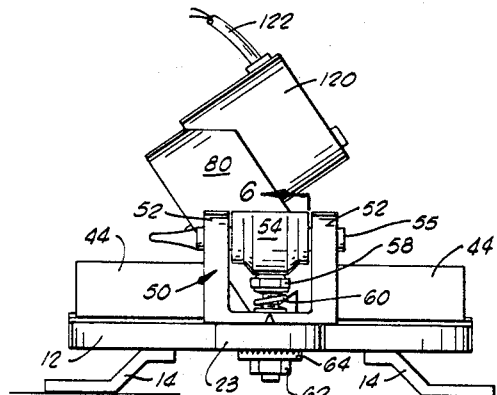
FIGURE 2 is an end view in elevation of the saw.
Figure 3:
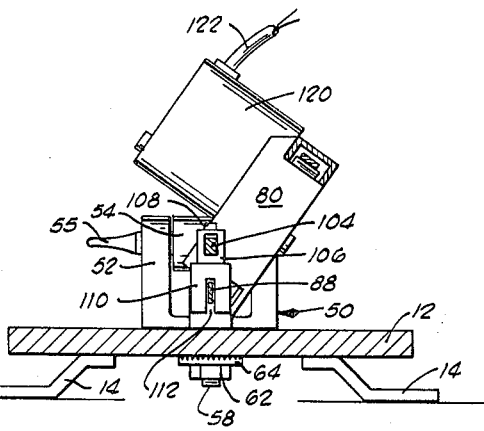
FIGURE 3 is a sectional view taken along line 3—3 of FIGURE 1.
Figure 6:
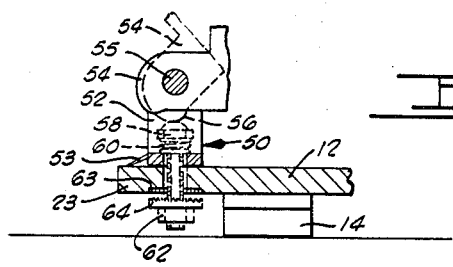
FIGURE 6 is a sectional view taken along 6—6 of FIGURE 2.

It will be noted in referring to FIGURES 1–3 that the disc housing 78 and 80 are canted so that the rotational axis of the discs located therein extend at an angle with respect to the vertical. This arrangement reduces the angle through which the saw blade 88 must be twisted after or before passing over the disc in order to have the saw blade extend in a vertical plane as it passes over the workpiece carriage 28. In order to twist the blade through the angle necessary to achieve verticality as it passes over the workpiece carriage 28, a pair of adjustable blade chuck assemblies 100 and 102 are secured to the opposed faces of the disc housings 80 and 78, respectively. Each of the adjustable chuck assemblies 100 and 102 includes a horizontally extending, generally rectangular cross sectioned slide bar 104 which is secured at one of its ends to the respective disc housing 80 or 78. Slidably mounted on the slide bars 104 are chuck shanks 106, and the particular preselected position which each chuck occupies on its respective slide bar 104 is determined by the setting of a set screw 108. A chuck head 110 is the final element in the blade chuck assemblies 100 and 102. The chuck heads 110 are provided with downwardly opening slots 112 therein (see FIGURE 3) which receive the saw blade 88 and function to align the saw blade in a vertical plane as it passes across the workpiece carriage 28.

Mounted on the disc housing 80 and extending therefrom at an angle so as to partially counterbalance the offset weight of the disc housing 78 and 80 is an electric motor 120 which is drivingly connected to the shaft of the blade disc located in the disc housing 80. A suitable electrical lead 122 is connected to the motor for supplying electrical power thereto and electrical circuitry is provided which extends through the saw blade housing 76 to a trigger-type switch 124 mounted in a pistol grip handle 126 which is secured to the disc housing 78 at the opposite end of the saw framework 74. Energization of the motor 120 is thus commenced by pressing the trigger switch 124.

*Operation*

The mitering band saw of the invention may be used in two basically different ways. In the first of these, the workpiece carriage 28 is pivoted on the bed plate 12 so as to move a workpiece supported thereon to a predetermined angle with respect to the saw blade 88. When the saw is to be used in this manner, the saw frame 74 is initially pivoted upwardly about the pivot pin 55, and then a workpiece, such as a flat plank or beam, which is to be cut by the saw blade 88 at a predetermined angle with respect to the longitudinal axis thereof is placed upon the saw pad 32 with one of the longitudinal edges thereof bearing against the fence sections 44. The workpiece thus extends transversely with respect to the direction of extension of the saw blade 88 and is directly beneath the saw blade. If it should then be determined that it is desired to cut across the workpiece at an angle of, say, 30°, the workpiece carriage 28 is pivoted about the pivot pin 26 to the dashed line position illustrated in FIGURE 5. This is accomplished by gripping the handle 40 and squeezing the detent 42 with the fingers against the bias of the spring 43. This releases the detent from the serrations or notches 24 formed in the lower surface of the end portion 18 of the bed plate 12, and permits the supporting plate 30 to slide freely across the surface of the bed plate.

The operator sights through the aperture 36 at the graduations in the scale 22 and aligns the cross hair 38 with the graduation which is marked 30° on the scale. When this position of the workpiece carriage 28 is reached, the detent 42 is released and the spring 43 biases it into engagement with the notches or serrations formed in the lower surface of the bed plate 12. The workpiece which is aligned by the fence sections 44 with respect to the saw blade 88 will now extend at the desired angle with respect to the saw blade.

The saw frame 74 is now lowered into cutting position by pivoting it about the detachable pivot pin 55, using the pistol grip handle 126. If the fence sections 44 should interfere with the saw blade 88 as a result of the pivotation of the workpiece carriage 28 to its new position, the fence sections 44 can be moved to different locations along the workpiece carriage by reason of their quick detachability from the workpiece carriage.

Sawing of the workpiece is commenced by squeezing the trigger-type switch 124 to energize the electric motor 120. The electric motor 120 in turn drives the blade disc located in the housing 80 in rotation, which causes the band saw type blade 88 to be moved across the workpiece in a manner well understood in the art. When the blade 88 has sawed completely through the workpiece, it cuts very slightly into the saw pad 32. Its movement downwardly into the saw pad 32 is limited, however, by the positive stop 90.

In sawing any workpiece, it is generally desirable to move the blade chucks 106 as close to the edges of the workpiece as possible in order that the distance over which the blade 88 may be twisted through the necessary angle to achieve verticality between the blade chucks 101 and 102 can be increased. This adjustment of the blade chucks is facilitated by the construction hereinbefore described and best illustrated in FIGURE 1.

In some instances, the workpiece may be too large or too irregular in its shape or configuration to permit mitering to be accomplished by the movement of the workpiece carriage 28. In these instances, the saw blade may itself be moved with respect to a fixed or stationary workpiece mounted on the workpiece carriage 28 so that the desired angle of cutting can be achieved. When the operator is confronted with a situation of this type, the saw frame 74 is pivoted upwardly about the horizontal, quick-detachable pivot pin 55 so that the cam arm 54 is moved to the position shown in dashed lines in FIGURE 6. It will be noted that when the cam arm is moved to this position, the saw frame 74 actually extends at a steeper or more nearly vertical angle than is normally required for the mere insertion of a workpiece under the saw blade 88 and on top of the workpiece carriage 28 preparatory to sawing.

In the illustrated position of the cam arm 54, the cam surface 56 bears against the spring biased pivot bolt 58 and moves it downwardly with respect to the bed plate 12. This downward movement of the pivot bolt 58 releases the serrated washer 64 from its engagement with the cooperating serrations 63 formed in the bottom of the bed plate 12 and permits the entire saw frame 74 and the U-shaped bracket 50 to be pivoted on the bed plate 12. As the saw frame 74 is pivoted in this manner, the U-shaped bracket 50 in its concurrent pivotation moves the pointer 53 through an arc so that it points to a particular one of the degree indicia located on the graduated, arcuate protuberance 23. The pointer 53 thus indicates the angle at which the saw blade 88 extends with respect to a workpiece supported on the workpiece carriage 28.

The fence sections 44 secured to the supporting plate 30 of the workpiece carriage 28 are then readjusted in their locations so as to avoid any interference with the saw blade 88, and the saw frame 74 is then pivoted downwardly using the handle 126. Downward pivotation of the saw frame 74 also pivots the cam arm 54 to a position such that the pivot bolt 58 is released and is biased upwardly by the spring 60. This permits the serrated washer 64 to again engage the serrations on the bottom surface of the base plate 12 and to effectively lock the bracket 50 in the selected position. Sawing of the workpiece can now be commenced in the manner hereinbefore described.

It will be apparent that it will be desirable in most instances to move the workpiece transversely across the workpiece carriage 28 in order to bring that part of the workpiece which it is desired to cut beneath the saw blade after the saw blade has been relocated in the manner described. Despite the need for such movement of the workpiece, versatility of the apparatus is preserved, since frequently space is available to move the workpiece in a transverse direction, but would not permit pivotation of the workpiece carriage 28 to a desired angle in order to position the workpiece as desired with respect to the saw blade.

A final aspect of the operation of the present invention merits consideration. In some instances, it may be desirable to remove completely the saw from the main frame 10 and from the workpiece carriage 28 which is pivotally mounted thereon. A situation of this type arises, for example, where it is desirable to transport the saw to a remote location and cut a member which is stationary or which cannot be conveniently placed on the workpiece carriage 28 for cutting in the manner hereinbefore described. Portability of the saw can be easily attained for purposes such as this by simply extracting the quick-detachable pivot pin 55 from the bracket 50 to release the cam arm 54 therefrom. The saw frame 74 can then be lifted away from the main frame 10 and workpiece carriage 28, and carried to any location where it is desired to use the saw.

From the foregoing description of the invention, it will have become apparent that the mitering type band saw of this invention is a very versatile tool permitting a workpiece to be cut at substantially any angle desired in a rapid and accurate fashion. The tool is relatively inexpensively constructed, is characterized by a long and trouble-free operating life and is entirely safe to utilize. Moreover, the tool is constructed in such a way that the saw portion thereof can be quickly detached from the remaining framework and workpiece supporting carriage portions of the apparatus and transported to any location where it may be desired to use the saw.

Although a preferred embodiment of the invention has been described herein in considerable detail in order to provide an example of the practice of the invention, it is to be understood that various modifications and innovations can be made in the invention without departure from the basic principles upon which it is founded. Such modifications and innovations are therefore deemed to be circumscribed by the spirit and scope of the invention except as the same may be necessarily limited by the appended claims or reasonable equivalents thereof.

I claim:

1. A mitering band saw comprising:
   a main framework including a horizontal bed plate having opposed end portions, at least one of said end portions terminating in an arcuate edge;
   a workpiece carriage pivotally mounted on said bed plate for pivotation about a vertical axis;
   vertically extending workpiece guide means detachably supported on said workpiece carriage and aligned with the pivotal axis of said workpiece carriage for guiding and aligning one edge of a workpiece;
   angle indexing means connected to said workpiece carriage for pivotation therewith and projecting across and beyond the arcuate edge of said bed plate;
   means on said one end portion of the bed plate for detachably engaging said angle indexing means and retaining said angle indexing means in a fixed position relative to said bed plate;
   a saw frame pivotally mounted on said main framework for pivotation about a substantially horizontal axis which is positioned adjacent the opposite side of said bed plate from said arcuate edge;
   said saw frame being pivotally connected to said main framework for pivotation about a vertical axis in addition to pivotation about said horizontal axis, said vertical axis of the saw frame intersecting the horizontal pivotal axis of the saw frame, and being horizontally spaced from the vertical axis of pivotation of said workpiece carriage;
   a continous saw blade movably mounted in said saw frame and having an exposed cutting edge extending across and above said bed plate at an angle not exceeding 90° to said workpiece guide means in all positios to which said workpiece carriage can be pivoted; and
   means adjacent said arcuate edge indicating the angle made by said saw blade with said guide means.

2. A mitering band saw as defined in claim 1 wherein said saw frame is quick-detachably connected to said main framework to permit said saw frame and saw blade to be removed from said main framework to facilitate portability.

3. A mitering band saw as defined in claim 1 wherein said workpiece carriage comprises:
   a supporting plate pivotally mounted on said bed plate for pivotation about a vertical axis; and
   a saw pad secured to, and supported on, the upper surface of said supporting plate.

4. A mitering band saw as defined in claim 1 wherein said workpiece guide means comprises a plurality of fence sections each having a flat, linear side, and each being selectively positioned and removably secured on the upper surface of said workpiece carriage with said flat sides in coplanar alignment.

5. A mitering band saw as defined in claim 1 and further characterized to include indicia adjacent the end of said bed plate opposite the end thereof which carries said arcuate edge, said indicia indicating an angle to which said saw frame is pivoted about said vertical axis; and
   angle indicating means cooperating with said saw frame for movement therewith and pointing to varying portions of said indicia as said saw frame is pivoted on its vertical axis.

6. A mitering band saw as defined in claim 1 and further characterized to include bracket means through which said saw frame is pivotally connected to said main framework, said bracket means including
   a U-shaped bracket having a web portion abutting said bed plate and having a pair of parallel legs extending therefrom;
   a cam arm journaled in said parallel legs for pivotation about a horizontal axis and secured to said saw frame;
   a bolt passing through the web portion of said bracket and having a head disposed in the path of pivotal movement of cam arm so that said bolt is reciprocated along the axis of its shank by the pivotal movement of said cam arm;
   a spring resiliently biasing the head of said bolt away from the web of said U-shaped bracket; and
   means on said bolt on the opposite side of said bed plate from the head of the bolt and engaging the lower surface of said bed plate, said means being disengageable from the lower surface of said bed plate upon reciprocating movement of said bolt.

7. A mitering band saw comprising:
   a main framework having a first end and a second end, and further having graduated, angle indicating scale means adjacent each of said ends;
   means for pivotally supporting on said main framework, a workpiece to be sawed;
   a saw frame pivotally mounted on said main framework for pivotation about horizontal and vertical axes both disposed adjacent one of the ends of said main framework;
   a continuous saw blade movably mounted in said saw frame and disposed over a portion of its length in a vertical plane intersecting the center of said main framework between the first and second ends thereof;
   first angle indexing means secured to said workpiece supporting means and movable therewith, said angle indexing means being engageable with said main framework at various points adjacent one end thereof to establish the angle made by a workpiece with said saw blade; and
   first angle indicating means on said one end of said framework for indicating in degrees, the angle made by a workpiece with the saw blade in various positions of said angle indexing means; and
   second angle indexing means secured to said saw frame and movable therewith, said angle indexing means being engageable with said main framework at various points adjacent the second end thereof to establish the angle made by said saw blade with said framework; and
   second angle indicating means on said framework adjacent the second end thereof for indicating the angle made by said saw blade with said framework.

8. A mitering band saw comprising:

a main framework including a horizontal bed plate having an upwardly facing, substantially monoplanar surface and having opposed end portions, with one of said end portions terminating in an arcuate edge, said arcuate edge having a scale graduated in units of angular measurement adjacent thereto and on the upper surface of said bed plate, and said bed plate further having a plurality of arcuately aligned serrations adjacent said arcuate edge and on the lower surface of said bed plate;

a horizontally extending supporting plate pivotally mounted on said bed plate for pivotation about a vertical axis;

a saw pad secured to, and supported on, the upper surface of said supporting plate;

a plurality of fence sections, each having a flat, vertically extending side, and each being detachably secured to the upper surface of said supporting plate with their flat sides in substantially monoplanar alignment, said fence sections being adjustably mounted on said supporting plate so that the horizontal spacing between said fence sections can be selectively varied;

a steering neck secured to said supporting plate and extending horizontally therefrom across the end portion of said bed plate carrying said arcuate edge and beyond said arcuate edge, said steering neck having an aperture formed therein and having a cross hair extending across said aperture over said scale;

a handle secured to said steering neck;

a detent pivotally connected to said handle and extending under said bed plate for engagement with a preselected one of said serrations;

a spring resiliently biasing said detent into engagement with said preselected serration;

a U-shaped bracket pivotally secured to the upwardly facing surface of said bed plate adjacent the opposite end portion of said framework from the end portion terminating in said arcuate edge, said U-shaped bracket having a web portion abutting said bed plate and having a pair of parallel legs extending upwardly from said web portion;

a cam arm journalled in said parallel legs for pivotation about a horizontal axis, said cam arm having a downwardly facing cam surface formed thereon, said cam arm being quick-detachably connected to said parallel legs;

a bolt passing through the web portion of said U-shaped bracket and having a head positioned below said cam arm for contacting said cam surface as said cam arm is pivoted about its horizontal axis whereby said bolt is biased in a linear movement along the axis of its shank upon pivotation of said cam arm;

resilient means engaging said bolt and resiliently biasing said bolt toward said cam arm;

stop means secured to said bolt on the opposite side of said bed plate from the head of said bolt and detachably engaging the lower surface of said bed plate for limiting the movement of said bolt toward said cam means and preventing rotation of said bolt relative to said bed plate, said stop means being movable with said bolt and disengageable from the lower surface of said bed plate upon movement of said bolt through said bed plate and away from the pivoted axis of said cam arm;

an elongated saw frame connected at one of its ends to said cam arm;

a continuous saw blade movably mounted in said elongated saw frame and having an exposed cutting edge extending across and above said saw pad in a vertical plane intersecting said saw pad;

a pair of horizontally spaced blade engaging chucks adjustably mounted on said saw frame and selectively positionable thereon to adjust the horizontal spacing therebetween;

an electric motor mounted on said saw frame and drivingly connected to said saw blade; and handle means connected to the other end of said saw frame from its end connected to said cam arm and including switch means for energizing said electric motor.

References Cited

UNITED STATES PATENTS

| | | | |
|---|---|---|---|
| 853,479 | 5/1907 | Smith | 143—19 |
| 2,928,439 | 3/1960 | Tester | 143—19 |
| 3,275,044 | 9/1966 | Kisling | 143—6 |

FOREIGN PATENTS

| | | |
|---|---|---|
| 13,646 | 7/1905 | Great Britain. |

DONALD R. SCHRAN, *Primary Examiner.*